(12) United States Patent
Casey et al.

(10) Patent No.: US 11,984,717 B2
(45) Date of Patent: May 14, 2024

(54) PROTECTION AGAINST AC VOLTAGE CONDITIONS

(71) Applicant: Bourns, Inc., Riverside, CA (US)

(72) Inventors: Kelly C. Casey, Corinth, TX (US); Trunh Thanh Thomas Tran, Frisco, TX (US)

(73) Assignee: Bourns, Inc., Riverside, CA (US)

( * ) Notice: Subject to any disclaimer, the term of this patent is extended or adjusted under 35 U.S.C. 154(b) by 398 days.

(21) Appl. No.: 17/335,943

(22) Filed: Jun. 1, 2021

(65) Prior Publication Data

US 2021/0288484 A1     Sep. 16, 2021

Related U.S. Application Data

(63) Continuation of application No. PCT/US2019/067011, filed on Dec. 18, 2019.

(60) Provisional application No. 62/782,336, filed on Dec. 19, 2018, provisional application No. 62/782,338, filed on Dec. 19, 2018.

(51) Int. Cl.
*H02H 3/08*     (2006.01)
*H02H 1/00*     (2006.01)
*H02H 3/10*     (2006.01)

(52) U.S. Cl.
CPC ............ *H02H 1/0015* (2013.01); *H02H 3/08* (2013.01); *H02H 3/10* (2013.01)

(58) Field of Classification Search
CPC ........... H02H 1/0015; H02H 3/08; H02H 3/10
See application file for complete search history.

(56) References Cited

U.S. PATENT DOCUMENTS

| 4,023,071 A | 5/1977 | Fussell |
| 6,018,452 A | 1/2000 | Meyerhoefer et al. |
| 6,212,048 B1 | 4/2001 | Chaudhry |

(Continued)

FOREIGN PATENT DOCUMENTS

| CN | 106208023 B | 12/2017 |
| DE | 102017109378 A1 | 8/2018 |

(Continued)

OTHER PUBLICATIONS

International Search Report dated May 6, 2020 for PCT/US2019/067011.
Written Opinion dated May 6, 2020 for PCT/US2019/067011.

*Primary Examiner* — Adolf D Berhane
(74) *Attorney, Agent, or Firm* — Chang & Hale LLP

(57) ABSTRACT

A protective circuit can include an AC line configured to provide power from an AC source, and a first protection circuit coupled to the AC line and implemented to be electrically parallel with a load circuit. The first protection circuit can be configured to be in an inactive state to be substantially non-conducting when a voltage across the load circuit is in a normal range or an active state to be substantially conducting when the voltage across the load circuit has an overvoltage value greater than the normal range to shunt power away from the load circuit. The protective circuit can further include a second protection circuit implemented to be electrically between the AC source and the load circuit. The second protection circuit can be configured to block power from the AC source in response to a condition resulting from the first protection circuit being in the active state.

7 Claims, 18 Drawing Sheets

(56) References Cited

U.S. PATENT DOCUMENTS

| | | |
|---|---|---|
| 2002/0008950 A1 | 1/2002 | Kim et al. |
| 2012/0089266 A1 | 4/2012 | Tomimbang et al. |
| 2012/0327542 A1* | 12/2012 | Wang .................. H02H 3/20 |
| | | 361/79 |
| 2014/0268443 A1 | 9/2014 | Nassar et al. |
| 2019/0372333 A1 | 12/2019 | Bohm et al. |
| 2022/0399714 A1* | 12/2022 | Kostakis ............. H02H 9/008 |

FOREIGN PATENT DOCUMENTS

| | | |
|---|---|---|
| FR | 2315788 A1 | 1/1977 |
| JP | S53 163531 U | 12/1978 |
| JP | H2 139435 U | 11/1990 |
| JP | H06 113445 A | 4/1994 |
| JP | 2001 136657 A | 5/2001 |
| JP | 2012 506687 A | 3/2012 |
| JP | 2012 212535 A | 11/2012 |
| JP | 2017 511098 A | 4/2017 |
| KR | 10-2008-0105293 A | 12/2008 |

* cited by examiner

PROTECTION AGAINST AC VOLTAGE CONDITIONS

CROSS-REFERENCE TO RELATED APPLICATION(S)

This application is a continuation of International Application No. PCT/US2019/067011 filed Dec. 18, 2019, entitled PROTECTION AGAINST AC VOLTAGE CONDITIONS, which claims priority to U.S. Provisional Application Nos. 62/782,338 filed Dec. 19, 2018, entitled AC VOLTAGE SWELL PROTECTOR, and 62/782,336 filed Dec. 19, 2018, entitled ACTIVE AC OVERVOLTAGE PROTECTION, the benefits of the filing dates of which are hereby claimed and the disclosures of which are hereby expressly incorporated by reference herein in their entirety.

BACKGROUND

Field

The present disclosure relates to circuits, devices, systems and methods for protection against AC voltage conditions.

Description of the Related Art

Many electrical devices such as appliances are powered by AC voltage. In some situations, a condition can exist for such an AC voltage, and such a condition can be undesirable and potentially damaging to electrical devices.

SUMMARY

In some implementations, the present disclosure relates to a protective circuit including an AC line configured to provide power from an AC source, and a first protection circuit coupled to the AC line and implemented to be electrically parallel with a load circuit. The first protection circuit is configured to be in an inactive state to be substantially non-conducting when a voltage across the load circuit is in a normal range or an active state to be substantially conducting when the voltage across the load circuit has an overvoltage value greater than the normal range to shunt power away from the load circuit. The protective circuit further includes a second protection circuit implemented to be electrically between the AC source and the load circuit. The second protection circuit is configured to block power from the AC source in response to a condition resulting from the first protection circuit being in the active state.

In some embodiments, the first protection circuit can include an electrically series combination of a gas discharge tube (GDT) and a metal-oxide varistor (MOV). The condition resulting from the first protection circuit being in the active state includes a high frequency component in a let-through signal. The second protection circuit can include an arc fault circuit interrupter (AFCI) implemented along the AC line and configured to block the power from the AC source upon sensing of the high frequency component. The high-frequency component in the let-through signal can be generated by the first protection circuit.

In some embodiments, each of the GDT and MOV can be configured as a separate device. In some embodiments, the GDT and MOV can be packaged together as a single device. In some embodiments, the GDT and MOV can include at least one shared part that is common to the GDT and the MOV. In such embodiments, the at least one shared part can include an electrode of the GDT configured to also function as an electrode of the MOV.

In some embodiments, the first protection circuit can include a thyristor overvoltage protection device. In some embodiments, the thyristor overvoltage protection device can be implemented as a thyristor integrated surge protector (TISP). In some embodiments, the condition resulting from the first protection circuit being in the active state can include an overcurrent in the AC line. The second protection circuit can include a transient blocking unit (TBU) implemented along the AC line and configured to block the overcurrent in the AC line. In some embodiments, the protective circuit can further include a power conversion component implemented between the TBU and the thyristor overvoltage protection device, and be configured to convert the AC power to an output having the voltage. Such an output of the power conversion component can be a DC voltage or an AC voltage. In some embodiments, the protective circuit can further include an overvoltage protection device implemented across the AC line and configured to shunt the AC power away from the power conversion component when activated by an overvoltage condition associated with the AC line. In some embodiments, the protective circuit can further include a fuse implemented along the AC line and configured to prevent the AC power from entering the AC line when tripped.

In some implementations, the present disclosure relates to an electrical apparatus that includes a load circuit and a protective circuit configured to provide power for the load circuit. The protective circuit includes an AC line configured to provide power from an AC source, and a first protection circuit coupled to the AC line and implemented to be electrically parallel with a load circuit. The first protection circuit is configured to be in an inactive state to be substantially non-conducting when a voltage across the load circuit is in a normal range or an active state to be substantially conducting when the voltage across the load circuit has an overvoltage value greater than the normal range to shunt power away from the load circuit. The protective circuit further includes a second protection circuit implemented to be electrically between the AC source and the load circuit. The second protection circuit is configured to block power from the AC source in response to a condition resulting from the first protection circuit being in the active state.

In some embodiments, the electrical apparatus can be an electrical appliance that includes a connection component configured to connect the protective circuit to the AC source so as to provide the power to the AC line.

In some implementations, the present disclosure relates to a protective circuit that includes an AC line configured to provide power from an AC source to a load circuit, and a sub-circuit including a series arrangement of a gas discharge tube (GDT) and a metal-oxide varistor (MOV). The sub-circuit is implemented across the AC line so as to be parallel with the load circuit when the load circuit is connected to the AC line. The sub-circuit generates a high frequency component in a let-through signal when in an activated state. The protective circuit further includes an arc fault circuit interrupter (AFCI) implemented along the AC line and configured to interrupt the power being provided to the load circuit upon sensing of the high frequency component generated by the sub-circuit.

In some embodiments, the AFCI can be implemented to be between the sub-circuit and the AC source when the AC line is connected to the AC source.

In some embodiments, each of the GDT and MOV can be configured as a separate device. In some embodiments, the GDT and MOV can be packaged together as a single device. In some embodiments, the sub-circuit can include at least one shared part that is common to the GDT and the MOV.

In some implementations, the present disclosure relates to an electrical apparatus that includes a load circuit and a protective circuit configured to provide power for the load circuit. The protective circuit includes an AC line configured to be connected to an AC source. The protective circuit further includes a sub-circuit having a series arrangement of a gas discharge tube (GDT) and a metal-oxide varistor (MOV). The sub-circuit is implemented across the AC line so as to be parallel with the load circuit. The sub-circuit generates a high frequency component in a let-through signal when in an activated state. The protective circuit further includes an arc fault circuit interrupter (AFCI) implemented along the AC line and configured to interrupt the power being provided to the load circuit upon sensing of the high frequency component generated by the sub-circuit.

In some embodiments, the electrical apparatus can further include a connection component configured to connect the protective circuit to an AC source so as to provide the power to the AC line. In some embodiments, the electrical apparatus can be an electrical appliance.

In some implementations, the present disclosure relates to a protective supply circuit that includes an AC line configured to receive AC power, and a transient blocking unit (TBU) implemented along the AC line. The protective supply circuit further includes a circuit protection device coupled to the AC line and implemented to be parallel with a load circuit when the load circuit is connected to the circuit protection device. The circuit protection device is configured to be non-conducting when a voltage being provided to the load circuit is in a normal range and conducting when the voltage has an overvoltage value greater than the normal range to shunt substantially all excess power away from the load circuit. The TBU is configured to block excessive current in the AC line resulting from the current in the circuit protection device.

In some embodiments, the protective supply circuit can further include a power conversion component implemented between the AC line the circuit protection device, and be configured to convert the AC power to an output having the voltage. The voltage from the output of the power conversion component can be a DC voltage or an AC voltage.

In some embodiments, the circuit protection device can be an overvoltage protection device. The circuit protection device can be a thyristor overvoltage protection device such as a thyristor integrated surge protector (TISP).

In some embodiments, protective supply circuit can further include an overvoltage protection device implemented across the AC line and configured to shunt the AC power away from the power conversion component when activated by an overvoltage condition associated with the AC line. In some embodiments, protective supply circuit can further include a fuse implemented along the AC line and configured to prevent the AC power from entering the AC line when tripped.

In some implementations, the present disclosure relates to an electrical apparatus that includes a load circuit configured to operate with a voltage, and a protective supply circuit configured to receive AC power and generate the voltage for the load circuit. The protective supply circuit includes an AC line configured to receive AC power, and a transient blocking unit (TBU) implemented along the AC line. The protective supply circuit further includes a circuit protection device coupled to the AC line and implemented to be parallel with the load circuit. The circuit protection device is configured to be non-conducting when a voltage being provided to the load circuit is in a normal range and conducting when the voltage has an overvoltage value greater than the normal range to shunt substantially all excess power away from the load circuit. The TBU is configured to block excessive current in the AC line resulting from the current in the circuit protection device.

In some embodiments, the protective supply circuit can further include a power conversion component implemented between the AC line the circuit protection device, and be configured to convert the AC power to an output having the voltage.

In some embodiments, the protective supply circuit can further include a connection component configured to connect the protective supply circuit to an AC source so as to provide the AC power to the AC line. In some embodiments, the electrical apparatus can be an electrical appliance.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1:
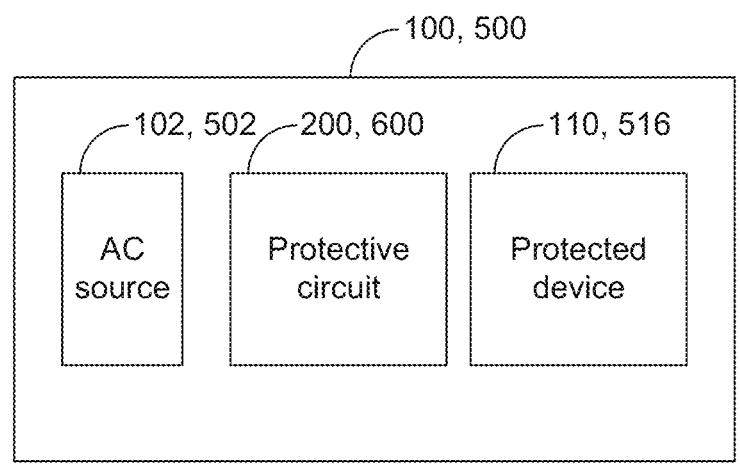
FIG. 1 depicts a circuit configuration that includes a protected device powered by an alternating current (AC) source through a protective circuit.

FIG. 1 depicts a configuration (100 and/or 500) in which a device or circuit (110, 516) being powered by an alternating-current (AC) source (102, 502) can be protected a protective circuit (200 and/or 600) having one or more features as described herein. Accordingly, the device or circuit (110, 516) can be considered to be a protected device or circuit.

In various examples disclosed herein, the configuration (100 and/or 500) can be implemented in different manners. For example, the protective circuit (200 and/or 600) can be implemented to be substantially outside of an apparatus having the protected device or circuit (110, 516), partially outside and partially within an apparatus having the protected device or circuit (110, 516), substantially within an apparatus having the protected device or circuit (110, 516), or any combination thereof.

Also, in various examples disclosed herein, the configuration (100 and/or 500) of FIG. 1 is sometimes described as a circuit. It will be understood that such a circuit can be implemented in, for example, a system, in an apparatus, in an electrical circuit, or some combination thereof. Accordingly, such a circuit or configuration may also be referred to as a system, an apparatus, or an electrical circuit.

Also, in various examples disclosed herein, the protected device or circuit (110, 516) of FIG. 1 is sometimes referred to herein as a protected circuit or simply as a circuit. It will be understood that such a circuit can be an electrical circuit, an electrical device, or some combination thereof.

FIGS. 2-12 generally relate to a first example configuration 100, and FIGS. 13-21 generally related to a second example configuration 500. In some embodiments, a configuration having one or more features as described herein can include a combination having one or more features of the first example configuration 100 and one or more features of the second example configuration.

First Example Configuration

Disclosed herein are examples related to a combination of an assembly having gas discharge tube (GDT) and metal-oxide varistor (MOV) functionality and an arc fault circuit interrupter (AFCI), to provide an overvoltage protection functionality. Such an overvoltage protection functionality can be effective against events such as alternating-current (AC) line voltage swells.

Figure 2:
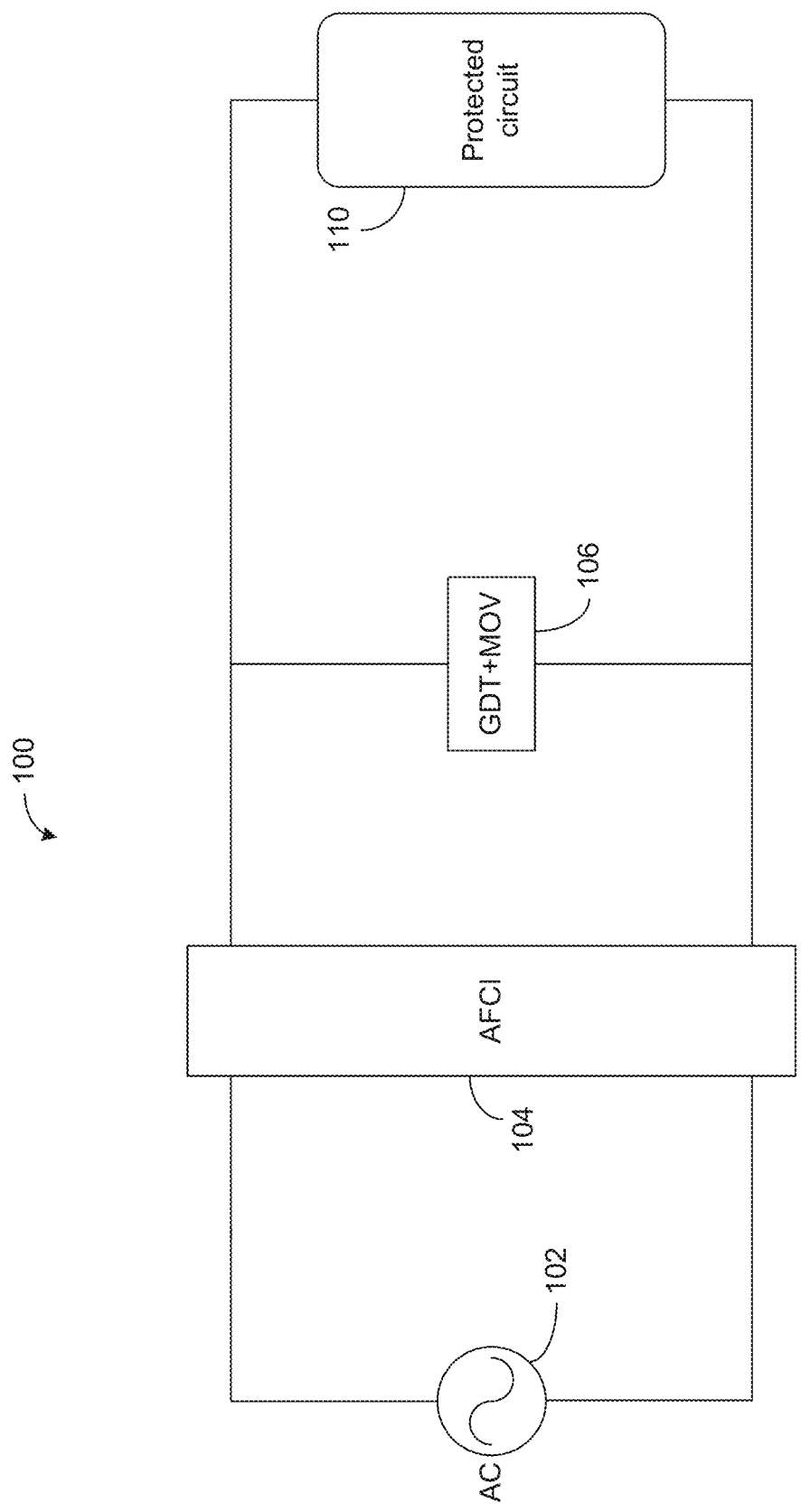
FIG. 2 shows an example circuit in which an AC power from an AC source is being utilized to provide power to a circuit or device to be protected.

FIG. 2 shows an example circuit 100 in which an AC power from an AC source 102 is being utilized to provide power to a circuit 110 to be protected. For the purpose of description, such a circuit can be considered to be a protected circuit due to an overvoltage protection functionality associated with the circuit 100. It will be understood that the protected circuit 110 can include one or more load circuit that utilize AC power, one or more load circuits that utilize DC power, or any combination thereof.

In the example of FIG. 2, the AC source 102 is shown to be coupled to the protected circuit 110 through an arc fault circuit interrupter (AFCI). In some embodiments, an assembly 106 having gas discharge tube (GDT) and metal-oxide varistor (MOV) functionalities can be provided across the protected circuit 110, so as to be parallel with the protected circuit 110. Examples of such a GDT+MOV assembly are described herein in greater detail.

It is noted that a typical AFCI can be configured to interrupt an AC circuit based on sensing of high frequency components associated with arcs caused by, for example, poor electrical connections. In some embodiments, and as described herein, the AFCI 104 of FIG. 2 can be configured to sense a signature generated during the operation of the GDT+MOV assembly 106. Based on such a sensed signature, the AFCI 104 can be activated so as to interrupt the AC power being delivered from the source 102 to the other side of the AFCI 104.

In some embodiments, the foregoing signature associated with the operation of the GDT+MOV assembly 106 can include one or more short-lived pulses having high frequency characteristics. Accordingly, if such a high frequency component is utilized, the AFCI 104 can be configured to be activated based on sensing of such a high frequency signature associated with the GDT+MOV assembly 106.

In some embodiments, the AFCI 104 can be configured to be activated based on a typical arc condition (e.g., resulting from a poor electrical connection) or the signature associated with the operation of the GDT+MOV assembly 106. In some embodiments, the AFCI 104 can be configured to be activated based the signature associated with the operation of the GDT+MOV assembly 106, but not a typical arc condition (e.g., resulting from a poor electrical connection).

Figure 3:
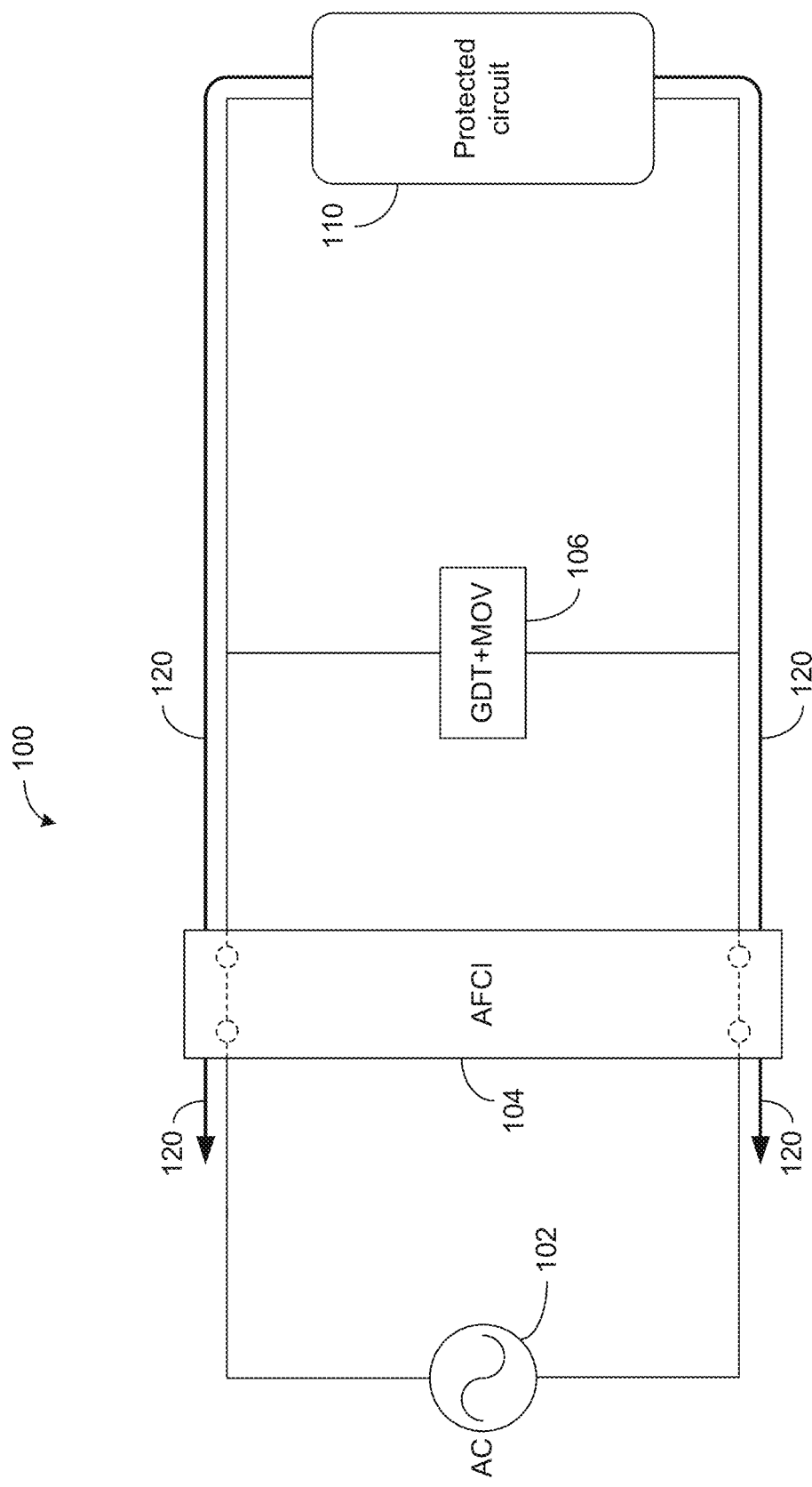
FIG. 3 shows an example of a normal operating condition for the circuit of FIG. 2.

Configured in the foregoing manner, FIG. 3 shows an example of a normal operating condition for the circuit 100 of FIG. 2. In FIG. 3, AC power from the AC source 102 is being delivered to the protected circuit 110. Accordingly, a normal AC current 120 is shown to be provided to the protected circuit 110 through the AFCI 104. In such a state, the GDT+MOV assembly 106 remains inactive. States of the various components of the circuit 100 corresponding to FIG. 3 are provided in Table 1.

TABLE 1

| AFCI | GDT + MOV assembly | Power delivered to protected circuit |
| --- | --- | --- |
| Inactive | Inactive | Yes |

Figure 4:
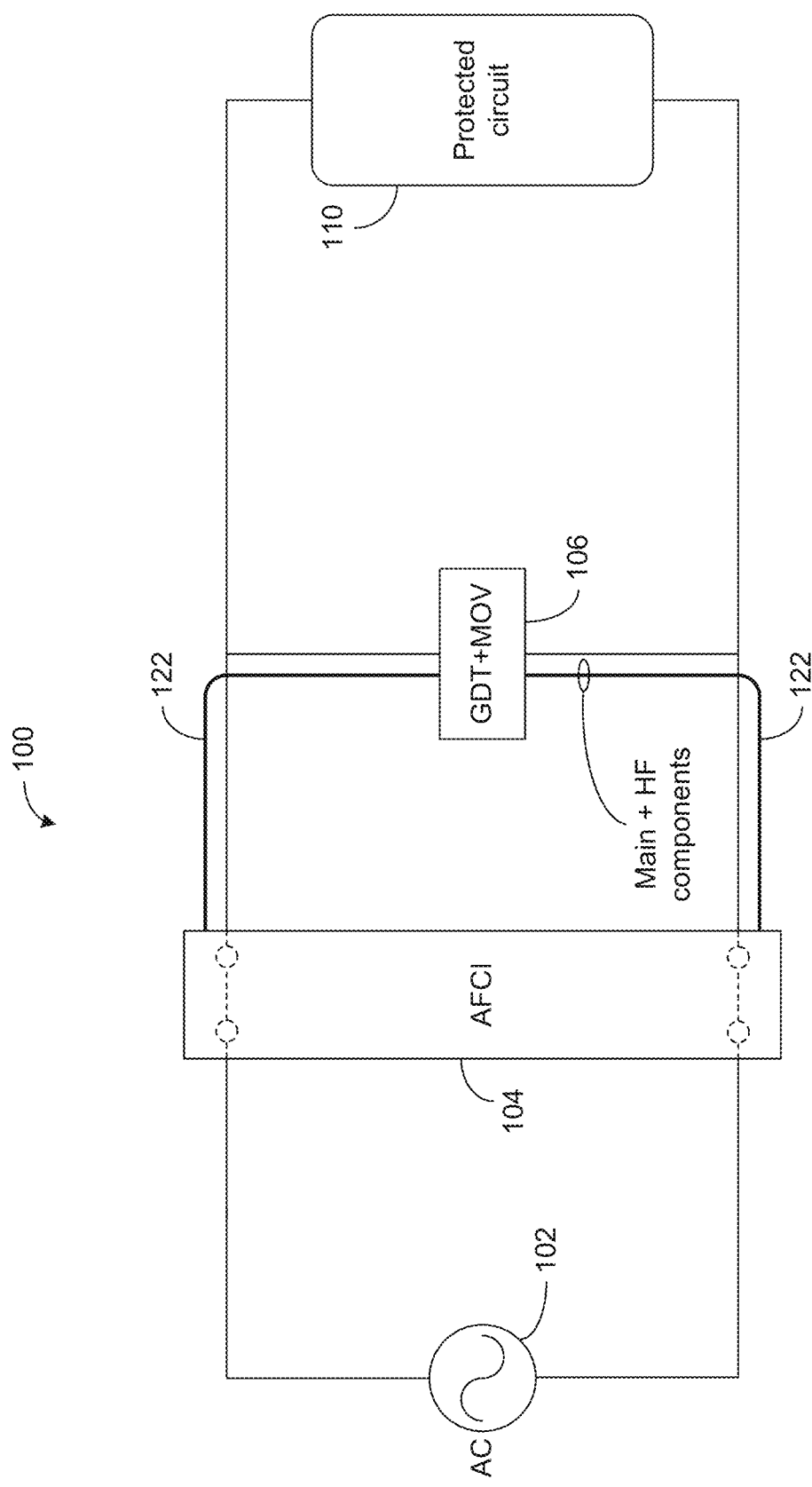
FIG. 4 shows an example of an overvoltage condition such as an AC voltage swell that results in a GDT+MOV assembly being activated so as to divert power away from the protected circuit or device, for the example circuit of FIG. 2.

FIG. 4 shows an example of an overvoltage condition such as an AC voltage swell that results in the GDT+MOV assembly 106 being activated so as to divert power away from the protected circuit 110. Accordingly, in FIG. 4, a current 122 is allowed to pass through the GDT+MOV assembly 106, thereby providing protection for the circuit 110. States of the various components of the circuit 100 corresponding to the condition of FIG. 4 are provided in Table 2.

TABLE 2

| AFCI | GDT + MOV assembly | Power delivered to protected circuit |
| --- | --- | --- |
| Inactive → Active | Active | No |

Figure 5:
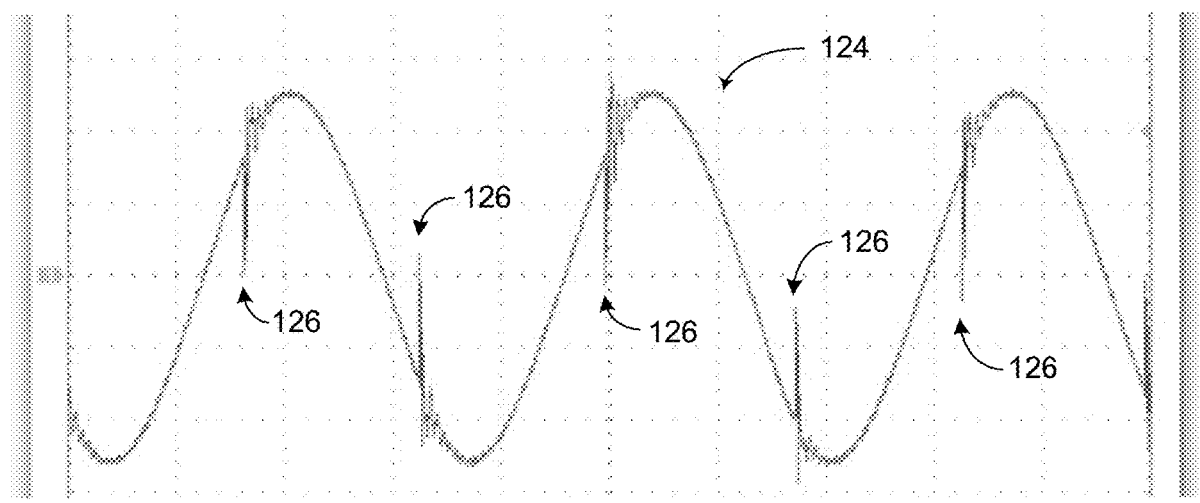
FIG. 5 shows an example of a signal corresponding to a current passing through the GDT+MOV assembly.

In the example of FIG. 4, the current 122 resulting from the activation of the GDT+MOV assembly 106 is shown to include a main component and a high frequency (HF) component. FIG. 5 shows an example of a signal 124 corresponding to the current (122 in FIG. 4) passing through the GDT+MOV assembly 106. More particularly, the example signal 124 is a voltage trace that includes a main component and a short-duration high frequency component 126 at an overvoltage condition associated with the signal 124.

Referring to FIGS. 4 and 5, when the AFCI 104 detects the presence of a high frequency component (such as the HF component 126 in the example of FIG. 5), it (AFCI 104) can be activated to interrupt the AC power from the source 102. Accordingly, in Table 2, the state of the AFCI 104 in FIG. 4 can be a transition state where the AFCI is being activated.

Figure 6:
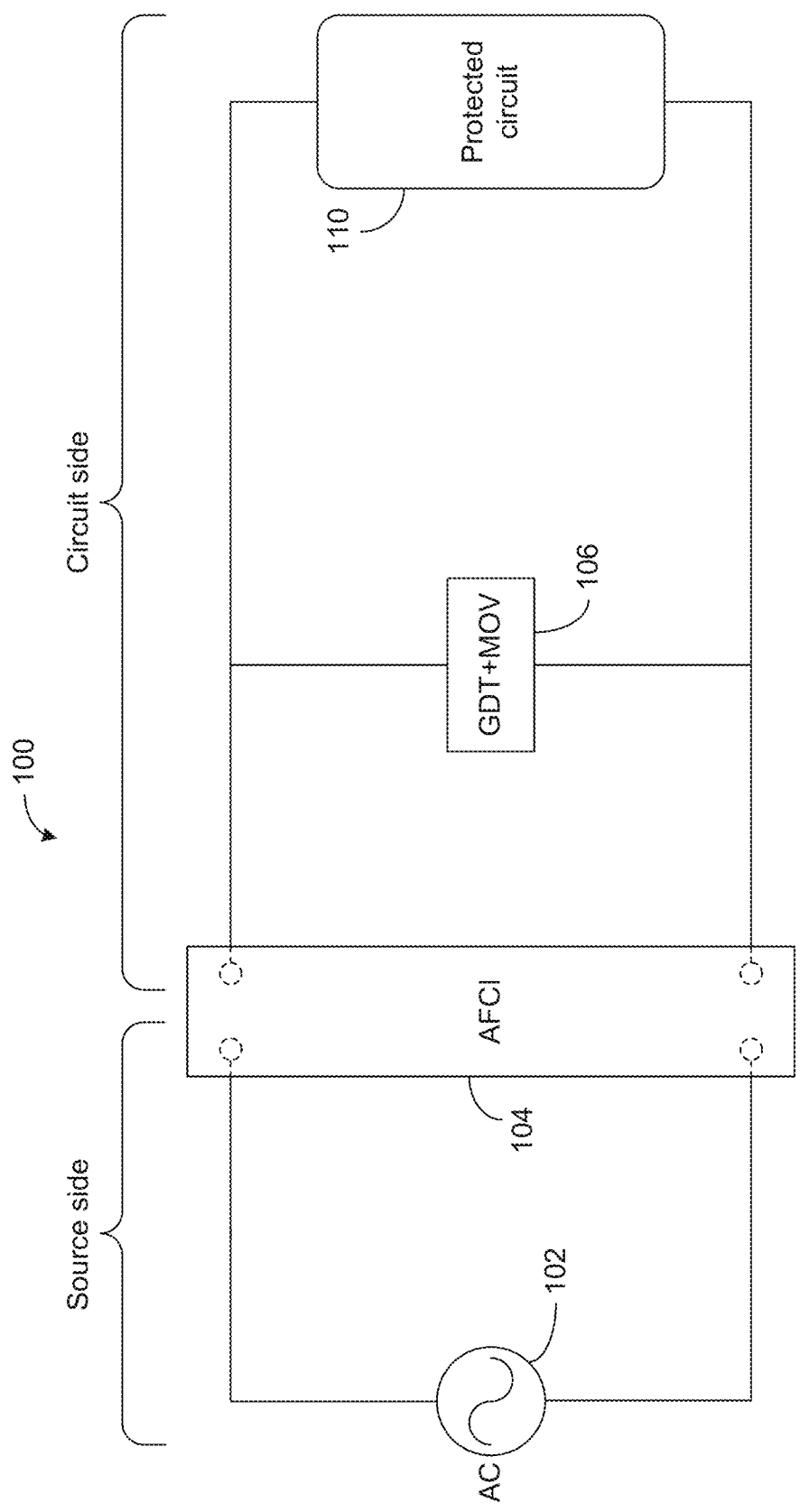
FIG. 6 shows an example where an arc fault circuit interrupter (AFCI) has been activated as a result of sensing of a high frequency signal component associated with the GDT+MOV assembly.

FIG. 6 shows an example where the AFCI 104 has been activated as a result of the sensing of the high frequency signal component associated with the GDT+MOV assembly 106. Accordingly, in FIG. 6, the AFCI 104 uncouples the source side from the circuit side. States of the various components of the circuit 100 corresponding to the condition of FIG. 6 are provided in Table 3.

TABLE 3

| AFCI | GDT + MOV assembly | Power delivered to protected circuit |
| --- | --- | --- |
| Active | Inactive | No |

In the example of FIG. 6, the circuit 100 being interrupted by the AFCI 104 results in power being substantially absent on the circuit side. Accordingly, in such a condition, the GDT+MOV assembly 106 can reset itself and become inactive.

In some embodiments, the circuit 100 in FIG. 6 can remain in the interrupted state until the AFCI 104 is reset (e.g., manually or with some control signal, after the overvoltage condition is no longer present). Once reset, the AFCI 104 can be in the inactive state, and thus allow power to be provided to the circuit side for operation of the protected circuit 110.

Figure 7A:
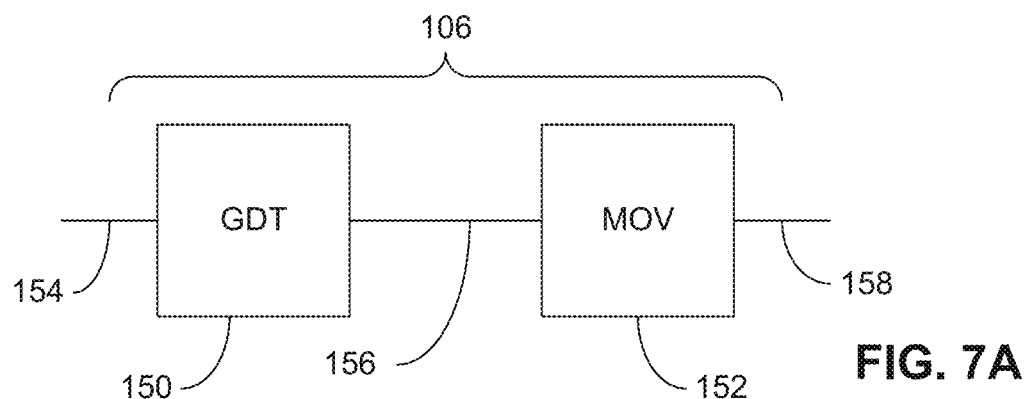
FIGS. 7A-7D show non-limiting examples of a GDT+MOV assembly that can be utilized in the circuit of FIG. 2.

FIGS. 7A-7D show non-limiting examples of a GDT+MOV assembly that can be utilized in the circuit of FIG. 2. FIG. 7A shows that in some embodiments, a GDT+MOV assembly 106 having one or more features as described herein can include a GDT device 150 and an MOV device 152, with each being a separate device. Such separate devices can be connected in series with a conductor 156. Accordingly, one end of the GDT+MOV assembly 106 can be connected through a conductor 154, and the other end can be connected through a conductor 158.

Figure 7B:
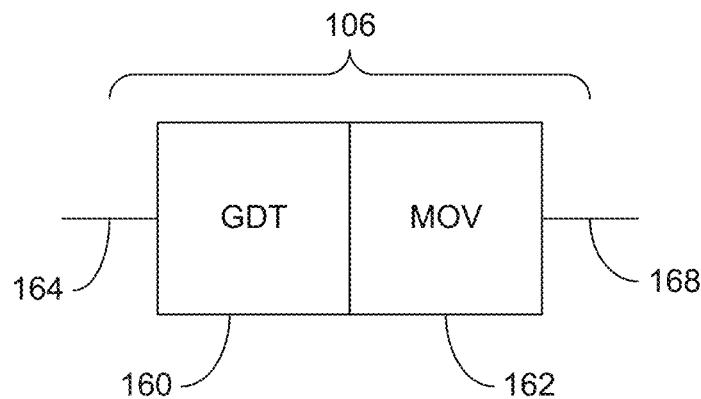

FIG. 7B shows that in some embodiments, a GDT+MOV assembly 106 having one or more features as described herein can include a GDT device 160 and an MOV device 162, combined together in a single packaged device. For example, a terminal or an electrode of the GDT device 160 can be in physical and electrical contact with a terminal or an electrode of the MOV device 162. Accordingly, one end of the GDT+MOV assembly 106 can be connected through a conductor 164, and the other end can be connected through a conductor 168.

Figure 7C:
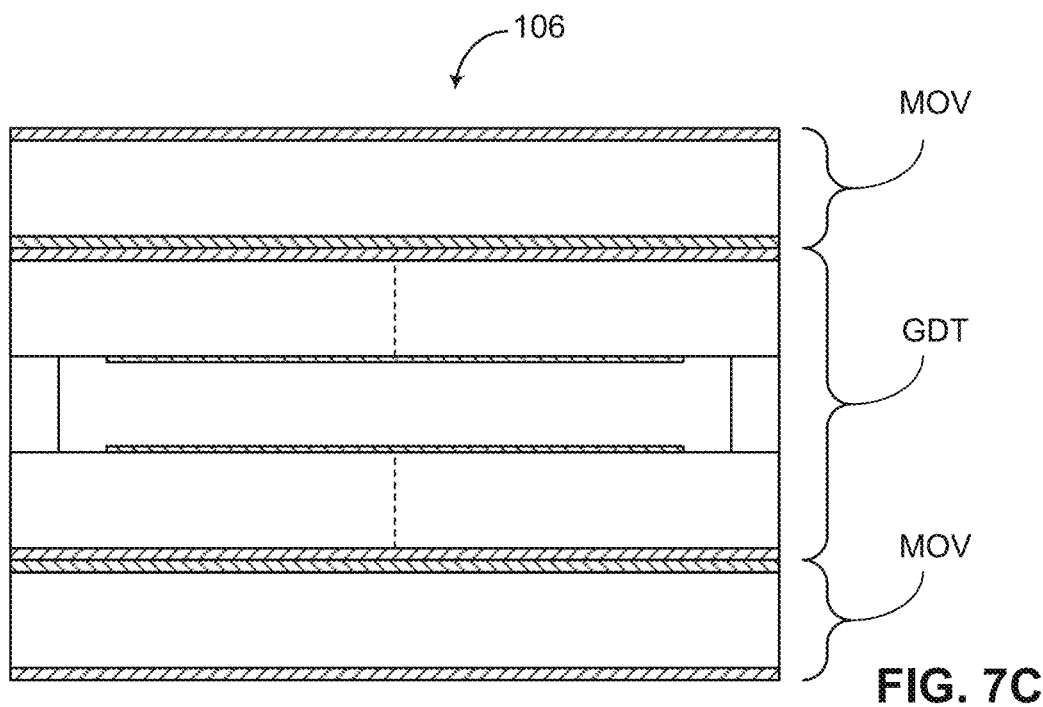

FIG. 7C shows a more specific example of the GDT+MOV assembly 106 of FIG. 7B. FIG. 7C also shows that in some embodiments, a GDT+MOV assembly 106 having one or more features as described herein can include one or more GDTs and one or more MOVs. For example, the GDT+MOV assembly 106 of FIG. 7C is shown to include a series combination of MOV+GDT+MOV. Additional details concerning such a configuration are disclosed in International Application No. PCT/US2019/049008 filed on Aug. 30, 2019, entitled INTEGRATED DEVICE HAVING GDT AND MOV FUNCTIONALITIES, the disclosure of which is hereby expressly incorporated by reference herein in its entirety.

Figure 7D:
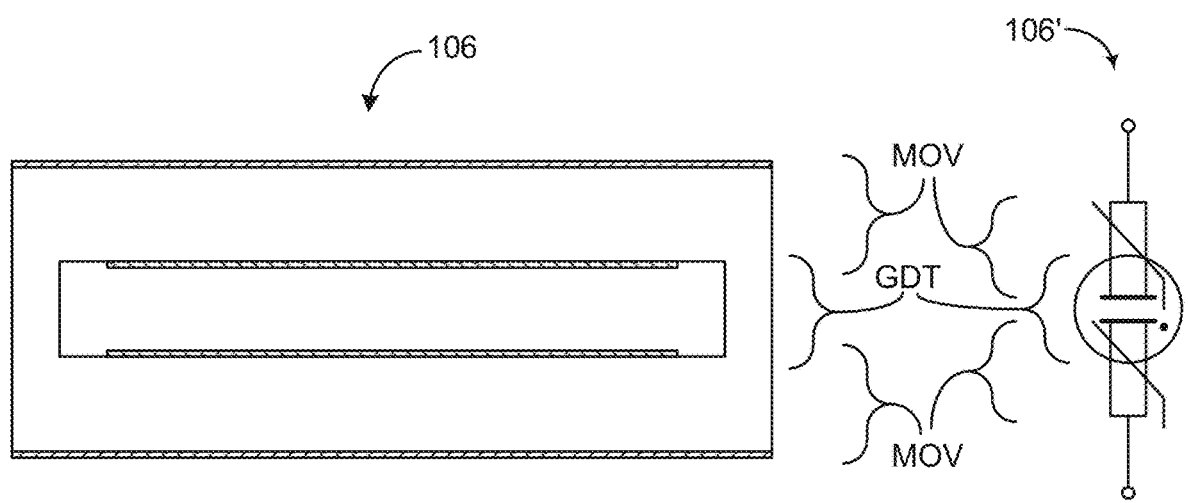

FIG. 7D shows that in some embodiments, a GDT+MOV assembly 106 having one or more features as described herein can include an integration of one or more parts associated with one or more GDTs and one or more MOVs. For example, the GDT+MOV assembly 106 of FIG. 7D can provide a functionality of a series combination of MOV+GDT+MOV similar to FIG. 7C, but with some parts being shared. Additional details concerning such a configuration are disclosed in the above-referenced International Application No. PCT/US2019/049008.

Figure 8:
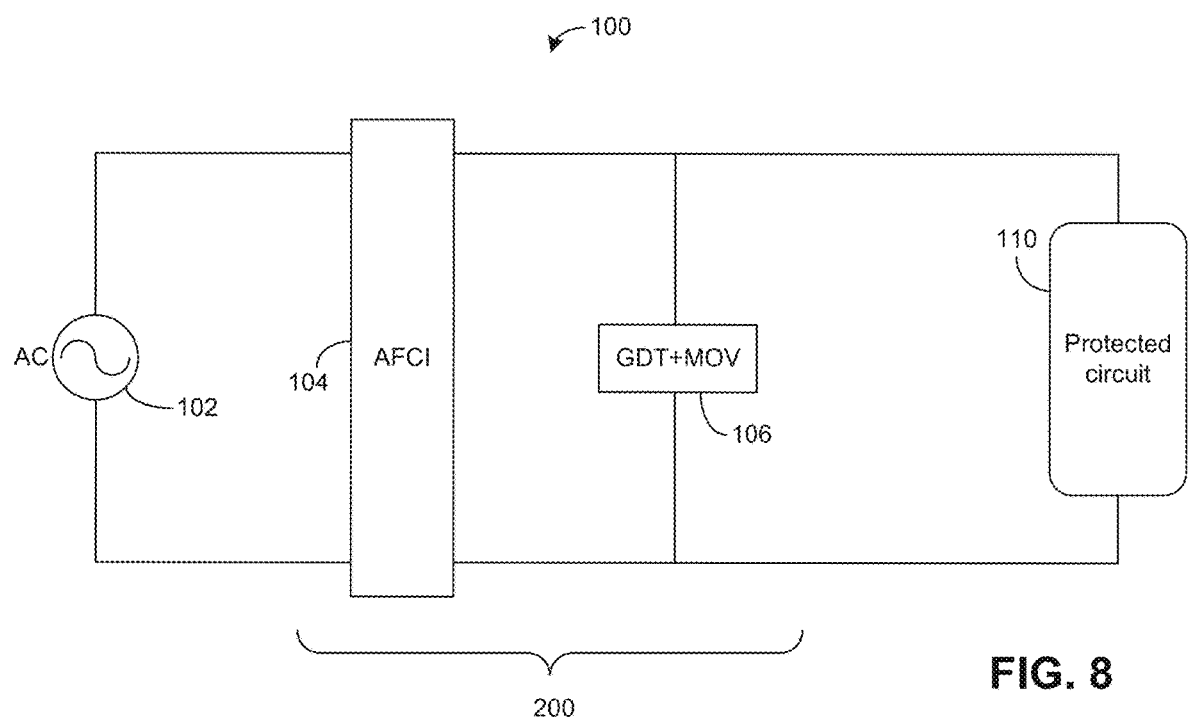
FIG. 8 shows that in some embodiments, the circuit of FIG. 2 can include different functional portions or blocks including a protective circuit.

FIG. 8 shows the circuit 100 of FIGS. 2-4 and 6. In FIG. 8, such a circuit can include a protective circuit 200 configured to provide power from an AC source 102 to a protected circuit 110. In some embodiments, such a protective circuit can include a GTD+MOV assembly 106 and an AFCI 104, and be configured to operate as described herein.

FIGS. 9-12 show that the protective circuit 200 of FIG. 8 can be implemented in different ways. More particularly, such a protective circuit can be implemented in a single apparatus, as parts of separate devices or systems, or any combination thereof.

Figure 9:
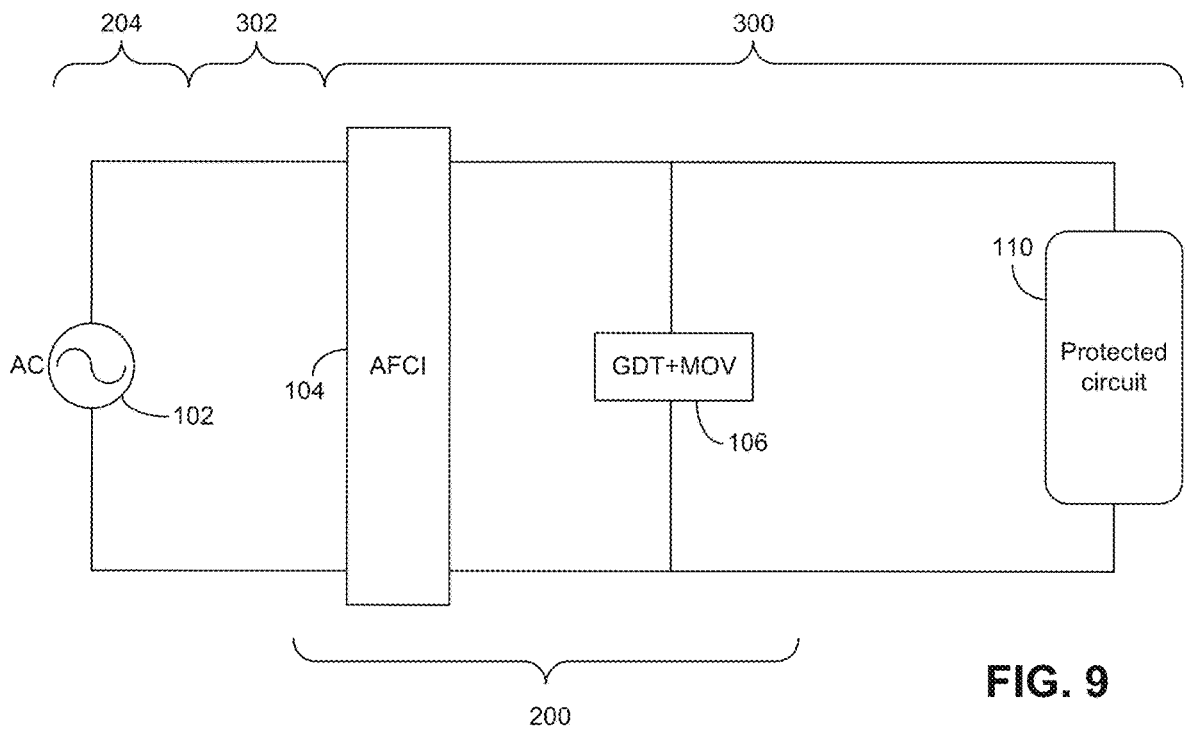
FIG. 9 shows that in some embodiments, the protective circuit of FIG. 8 can be implemented in a given apparatus.

For example, FIG. 9 shows that a protective circuit 200 having one or more features as described herein can be implemented in a given apparatus. In such a context, a portion to the left of the protective circuit 200 can be considered to be a connection component 302, and a portion left of the connection component 302 can be considered to be an AC source 204. In such a context, the protective circuit 200 can be configured to be capable of being connected to an AC source through a connection component.

Figure 10:
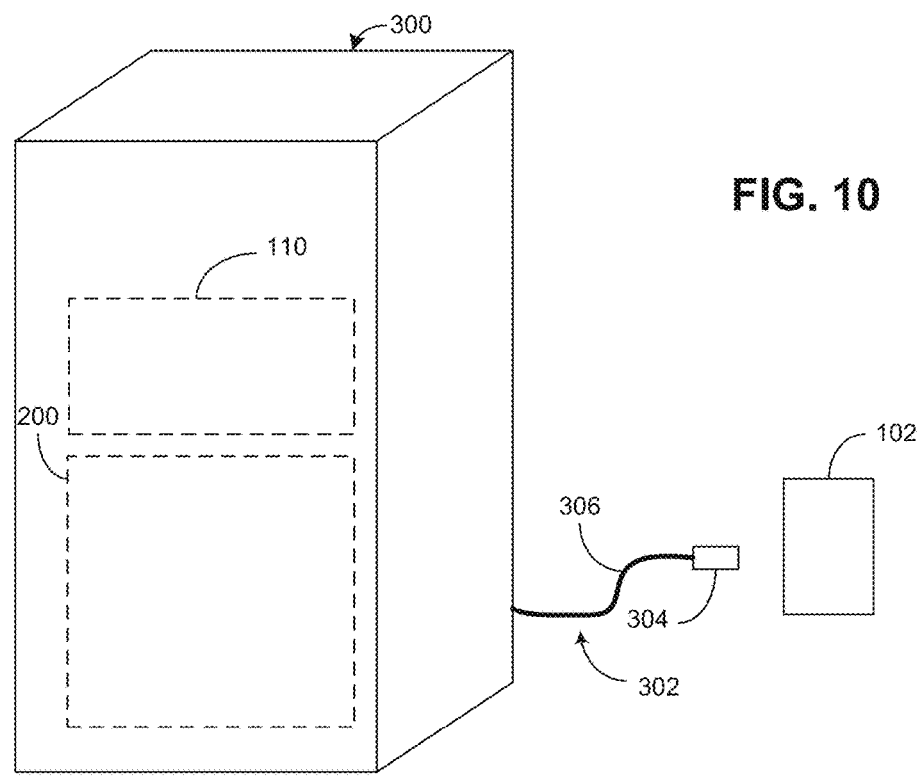
FIG. 10 shows an example of an apparatus having an arrangement of components similar to the example of FIG. 9.

FIG. 10 shows an example of an apparatus 300 having an arrangement of components similar to the example of FIG. 9. More particularly, the apparatus 300 can include one or more protected circuits 110 that are supplied with power through a protective circuit 200. The protective circuit 200 can include one or more features as described herein, and can be configured to provide power to the one or more protected circuits 110 from an AC source 102 that is external to the apparatus 300. In the example of FIG. 10, the AC source 102 can be, for example, an electrical outlet configured to receive an appropriately configured plug 304. In some embodiments, such a plug can be connected to an electrical cord 306; thus, the cord 306 and the plug 304 can be parts of an AC power connection component 302 associated with the apparatus 300.

In some embodiments, the apparatus 300 of FIG. 10 can be any electrical device configured to be plugged into an AC outlet for operation. Such an electrical device can be, for example, a household appliance.

Figure 11:
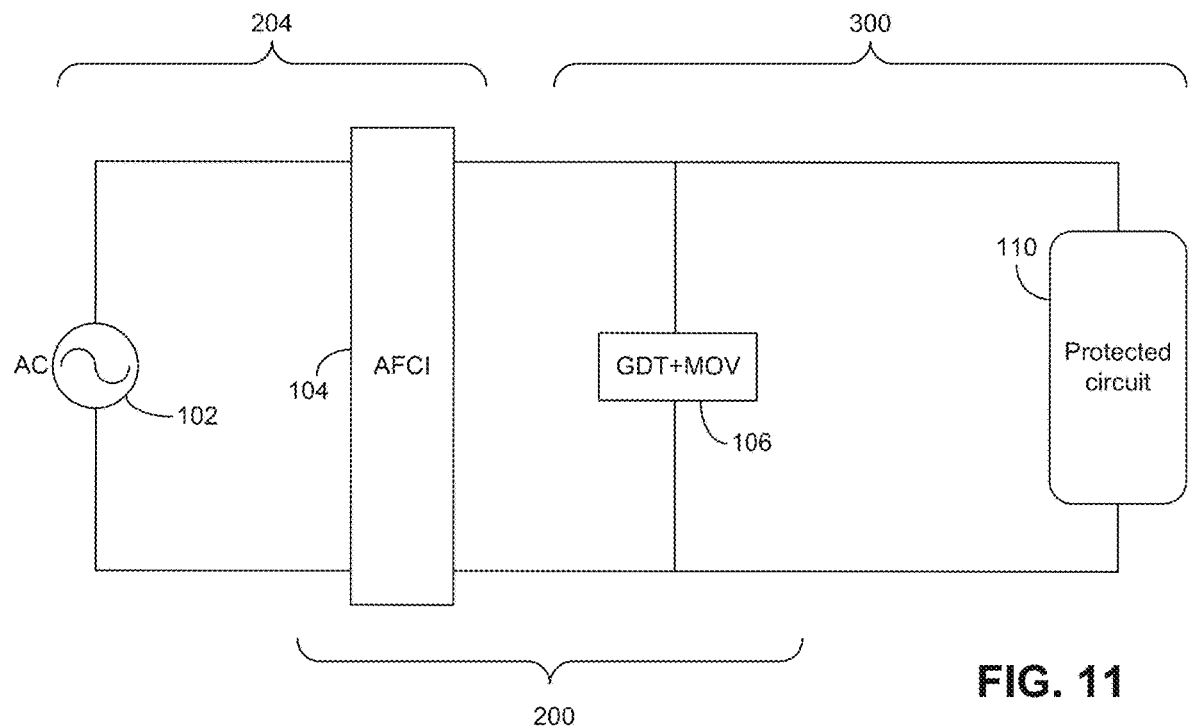
FIG. 11 shows that in some embodiments, the protective circuit of FIG. 8 can be implemented partially in a given apparatus, and partially in a manner that is more associated with an AC source.

In another example, FIG. 11 shows that a protective circuit 200 having one or more features as described herein can be implemented partially in a given apparatus, and partially in an assembly that is more associated with an AC source. For example, an AFCI 104 of the protective circuit 200 can be in a generally fixed position relative to an AC source 102. An AC outlet implemented on a wall, with the outlet including the AFCI functionality, is an example of such a configuration. In such a context, a portion indicated as 204 can be considered to be an AC source having partial protective functionality.

In the example of FIG. 11, the GTD+MOV assembly 106 is shown to be implemented as part of a given apparatus 300. It is noted that while such a GTD+MOV assembly can also be implemented as part of the portion 204, it may be more desirable to have the GTD+MOV assembly 106 be configured to accommodate the electrical properties of the protected circuit 110 (and thus be part of the same apparatus 300).

Figure 12:
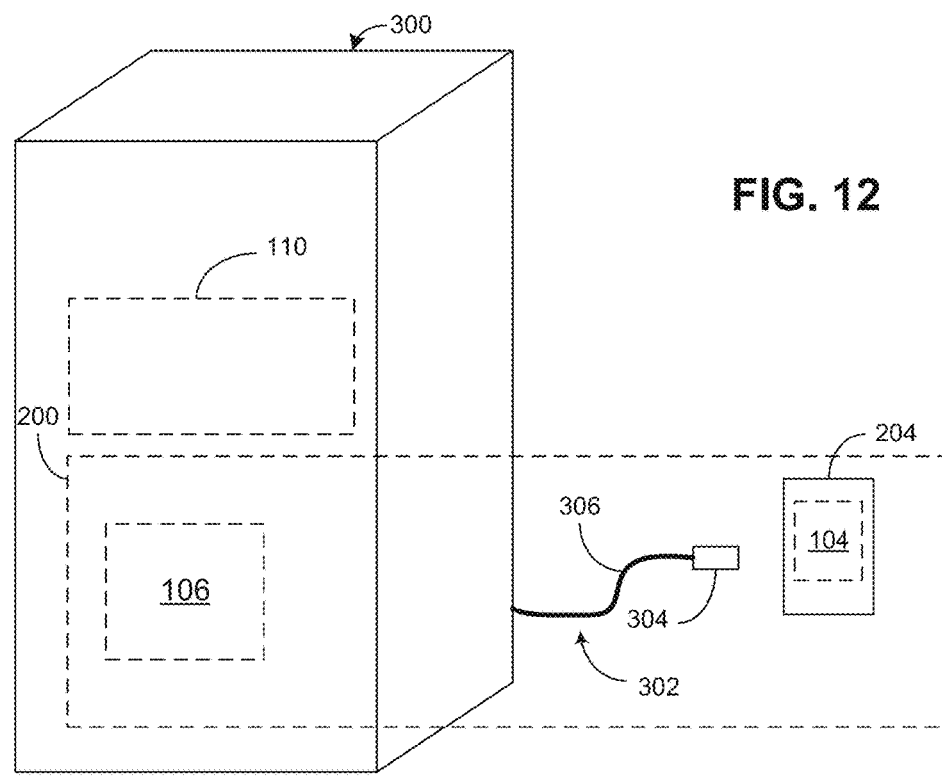
FIG. 12 shows an example of an apparatus having an arrangement of components similar to the example of FIG. 11.

FIG. 12 shows an example of an apparatus 300 having an arrangement of components similar to the example of FIG. 11. More particularly, the apparatus 300 can include one or more protected circuits 110 that are supplied with power through a protective circuit 200. The protective circuit 200 can include one or more features as described herein, and can be configured to provide power to the one or more protected circuits 110 from an AC source 204 that is external to the apparatus 300. In the example of FIG. 12, the AC source 204 can be, for example, an electrical outlet configured to receive an appropriately configured plug 304. In some embodiments, such a plug can be connected to an electrical cord 306; thus, the cord 306 and the plug 304 can be parts of an AC power connection component 302 associated with the apparatus 300.

In the example of FIG. 12, a portion of the protective circuit 200 is shown to be implemented as part of the apparatus 300, and also as part that is associated with the AC source 204.

Second Example Configuration

Disclosed herein are examples related to coordinated use of a crowbar circuit protection device such as an integrated surge protector (e.g., a thyristor integrated surge protector (TISP)) and a transient blocking unit (TBU), to provide a self-protecting and self-resetting overvoltage protection functionality. Such an overvoltage protection functionality can be effective against events such as lightning, sub-circuit failures, and/or alternating-current (AC) line voltage swells. It will be understood that the TISP element is an example only and other voltage protection devices (e.g., gas discharge tube (GDT), metal-oxide varistor (MOV), transient voltage suppressor (TVS), etc.) may be utilized as well.

Figure 13:
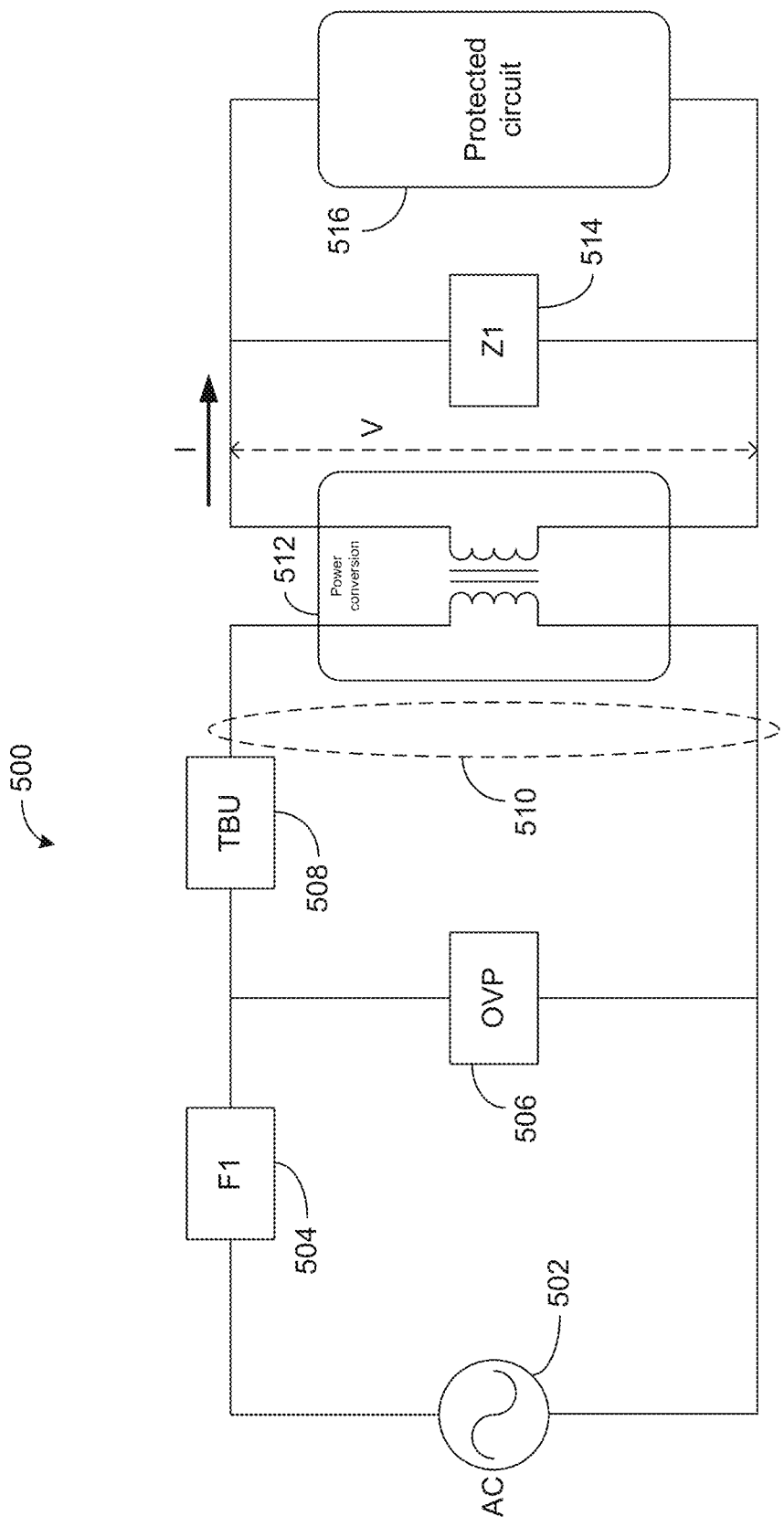
FIG. 13 shows another example circuit in which an AC power from an AC source is being utilized to provide power to a circuit or device to be protected.

FIG. 13 shows an example circuit 500 in which an AC power from an AC source 502 is being utilized to provide power to a load 516. For the purpose of description, such a load can be considered to be a protected circuit due to an overvoltage protection functionality associated with the circuit 500.

In the example of FIG. 13, the AC source 502 is shown to be coupled to a power conversion component 512 through an AC line 510. The power conversion component 512 can covert the AC power provided through the AC line 510 into a direct-current (DC) or an alternating-current (AC) power having a current I and a voltage V.

In some embodiments, a crowbar circuit protection device 514 such as an integrated surge protector (e.g., a totally integrated surge protector (TISP)) can be provided across the protected circuit 516, and a transient blocking unit (TBU) 508 along the AC line 510. Examples related to operations of the crowbar circuit protection device 514 and the TBU 508 are described herein in greater detail.

In some embodiments, an overvoltage protection (OVP) device 506 can be provided across the AC line 510, such that the TBU 508 is between the OVP device 506 and the power conversion component 512. Such an OVP device (506) can be activated in certain situations (e.g., an overvoltage condition arising on the AC source side). In some embodiments, a fuse (F1) 504 can be provided along the AC line 510, such that the fuse 504 is between the OVP device 506 and the AC source 502. Such a fuse can be activated in certain situations (e.g., a large surge on the AC source side).

In the example of FIG. 13, if a surge event on the AC source side is sufficiently large, the fuse 504 can be tripped, and cut power to the entirety of the circuit 500 to the right of the fuse 504. There may be a surge on the AC source side that does not trip the fuse 504, but activates the OVP device 506. In such a situation, current from the AC source 502 can be generally shunted through the OVP device 506 and away from the power conversion component 512. In some embodiments, the OVP device 506 can be, for example, a metal-oxide varistor (MOV).

Figure 14:
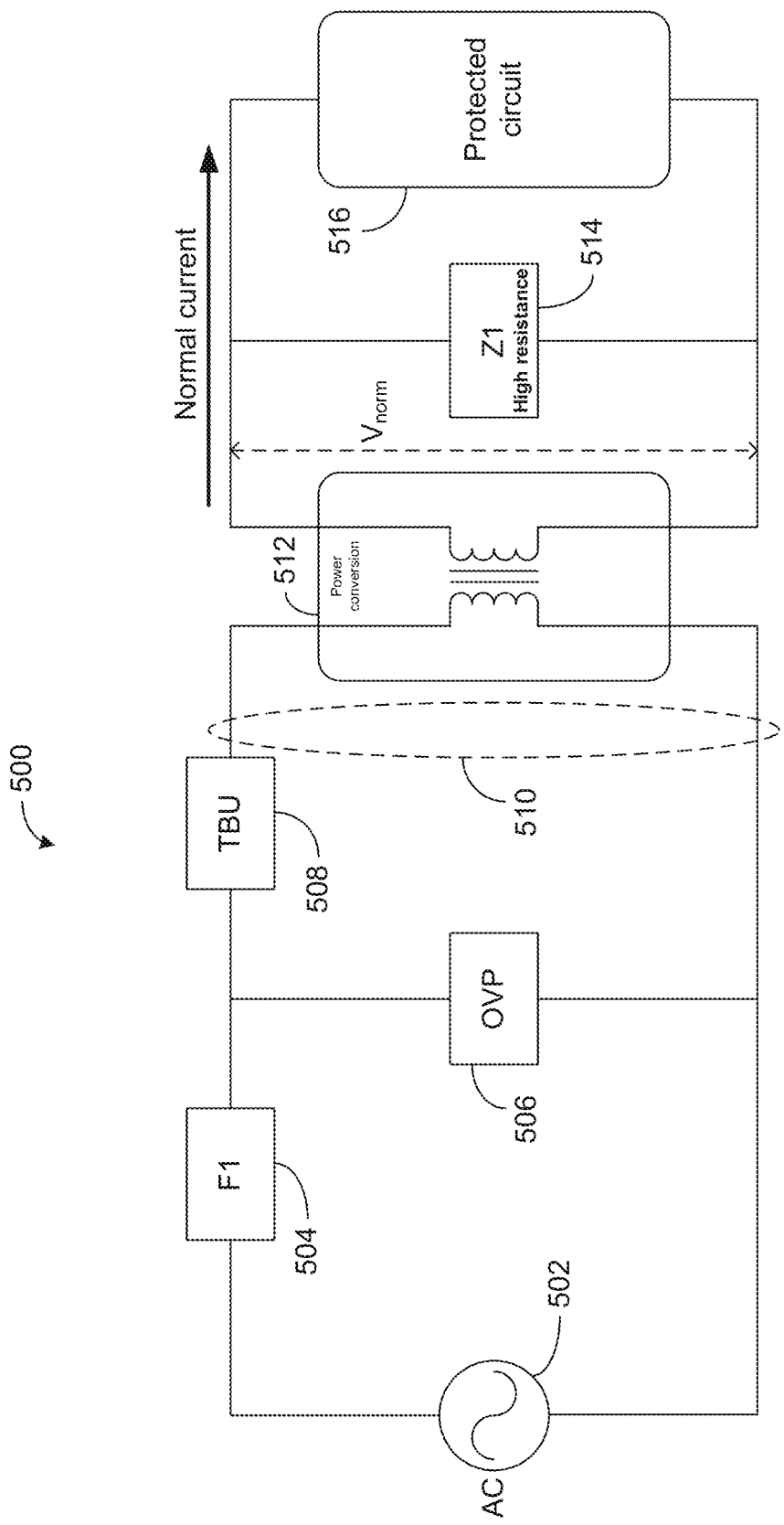
FIG. 14 shows an example of a normal operating condition for the circuit of FIG. 13.

Configured in the foregoing manner, FIG. 14 shows an example of a normal operating condition for the circuit 500 of FIG. 13. In FIG. 14, AC power from the AC source 502 is being converted into DC power by the power conversion component 512 to provide a normal current to the load (protected circuit) 516. Accordingly, a normal voltage $V_{norm}$ exists across the protected circuit 516, as well as across the crowbar circuit protection device 514. The crowbar circuit protection device 514 is inactive and essentially acts as an open circuit. States of the various components of the circuit 500 are provided in Table 4.

TABLE 4

| F1 | OVP | TBU | Z1 | Voltage V across the load 116 |
|---|---|---|---|---|
| Untripped | Inactive | Inactive | Inactive | $V_{norm}$ |

Figure 15:
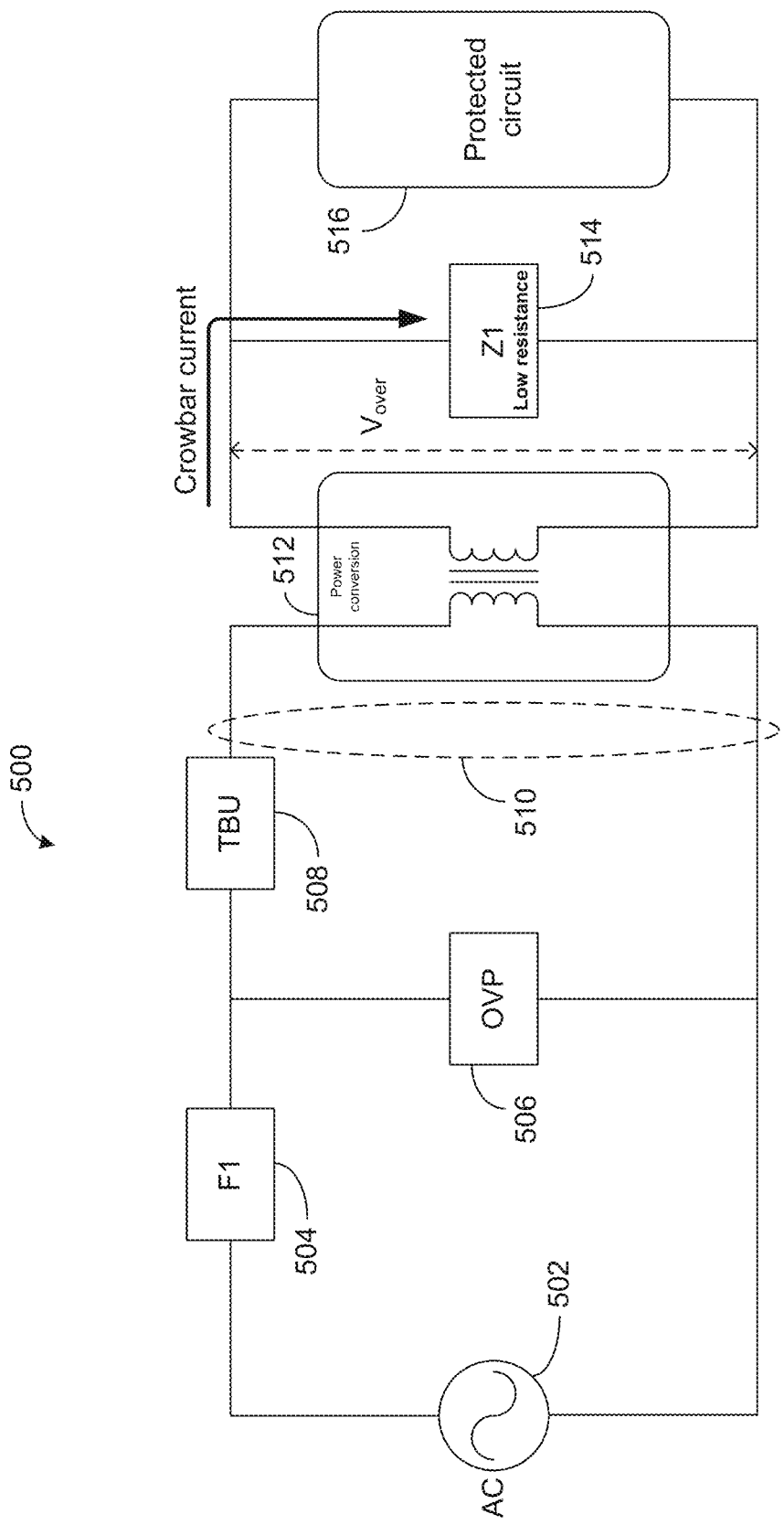
FIG. 15 shows an example of an overvoltage condition that can arise across the protected circuit or device for the example circuit of FIG. 13.

FIG. 15 shows an example of an overvoltage condition that can arise across the protected circuit 516. Such an overvoltage condition may arise due to an event on either side of the power conversion component 512. Thus, for the purpose of description, it will be assumed that an overvoltage $V_{over}$ across the protected circuit 516 results from some condition. When such an overvoltage condition occurs, the crowbar circuit protection device 514 becomes active and becomes conductive. Thus, a current resulting from the overvoltage condition is shunted away from the protected circuit 516 and routed through the crowbar circuit protection device 514. Accordingly, in FIG. 15, such a current being shunted through the crowbar circuit protection device 514 is indicated as a crowbar current. Once such a crowbar current is established, the voltage across the crowbar circuit protection device 514 becomes approximately zero. States of the various components of the circuit 500 corresponding to the condition of FIG. 15 are provided in Table 5.

TABLE 5

| F1 | OVP | TBU | Z1 | Voltage V across the load 116 |
|---|---|---|---|---|
| Untripped | Inactive | Inactive | Active | $V_{over}$ initially, transitions to zero |

In the example of FIG. 15, the conductive nature of the crowbar circuit protection device 514 (when activated) results in the crowbar current flowing with little or no resistance. Thus, the power conversion component 512 can draw an increased amount of current from the AC line 510 in response to the foregoing crowbar current.

Figure 16:
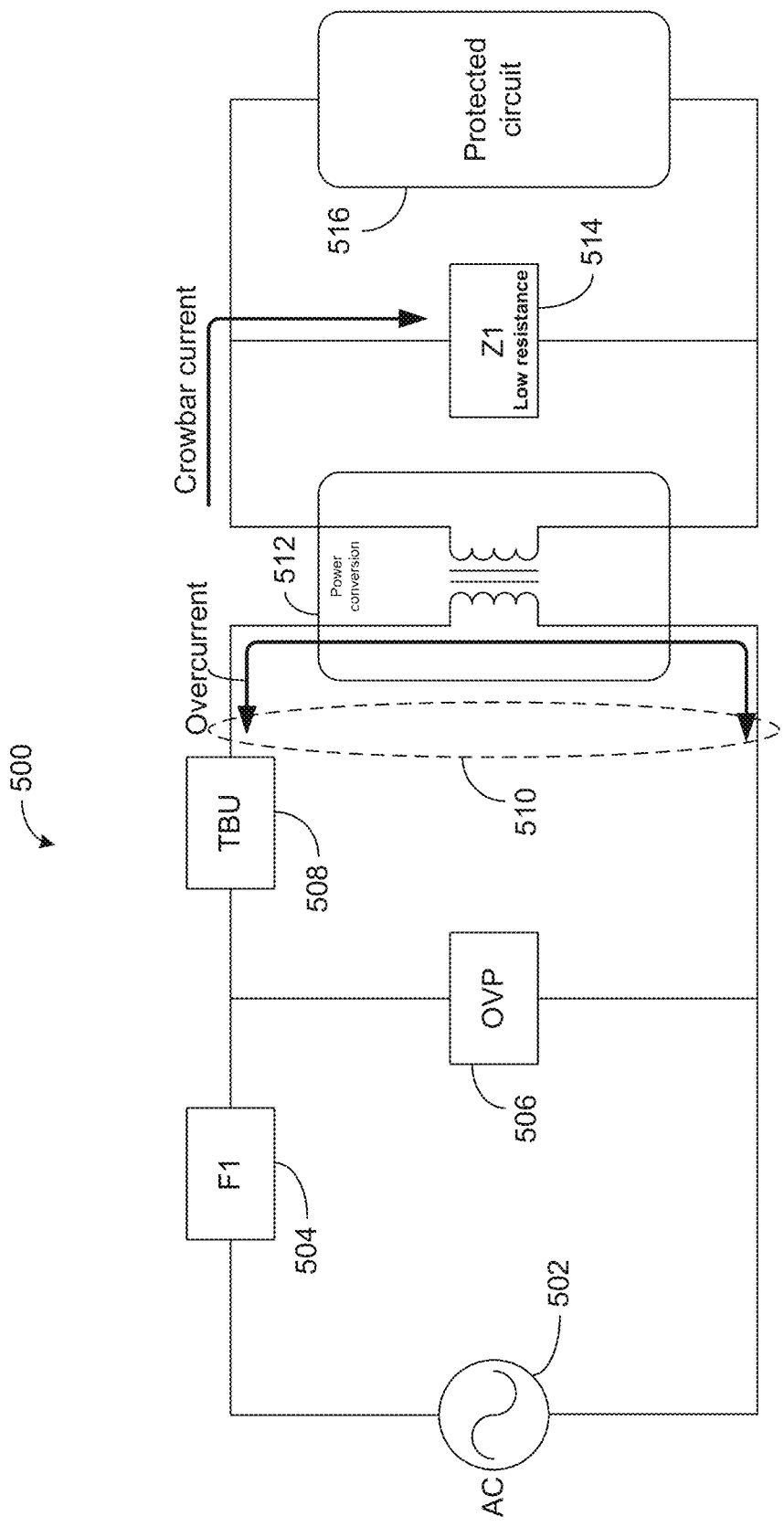
FIG. 16 shows an example of an increased amount of current drawn in an AC line by a power conversion component for the example circuit of FIG. 13.

FIG. 16 shows an example of the foregoing increased amount of current drawn in the AC line 510 by the power conversion component 512. More particularly, such a current resulting as a response to the crowbar current is indicated as an overcurrent flowing in the AC line 510. In the example of FIG. 16, it is assumed that the power conversion component 512 does not have a current-limiting feature. States of the various components of the circuit 500 corresponding to the condition of FIG. 16 are provided in Table 6.

TABLE 6

| F1 | OVP | TBU | Z1 | Voltage V across the load 116 |
|---|---|---|---|---|
| Untripped | Inactive | Inactive | Active | Zero |

In the example of FIG. 16, the overcurrent in the AC line 510 is assumed to be an additional current drawn as a result of the increased current (indicated as the crowbar current). If the total current including the overcurrent in the AC line 510 exceeds some threshold trip current of the TBU 508, the TBU 508 becomes active and provides a blocking functionality.

Figure 17:
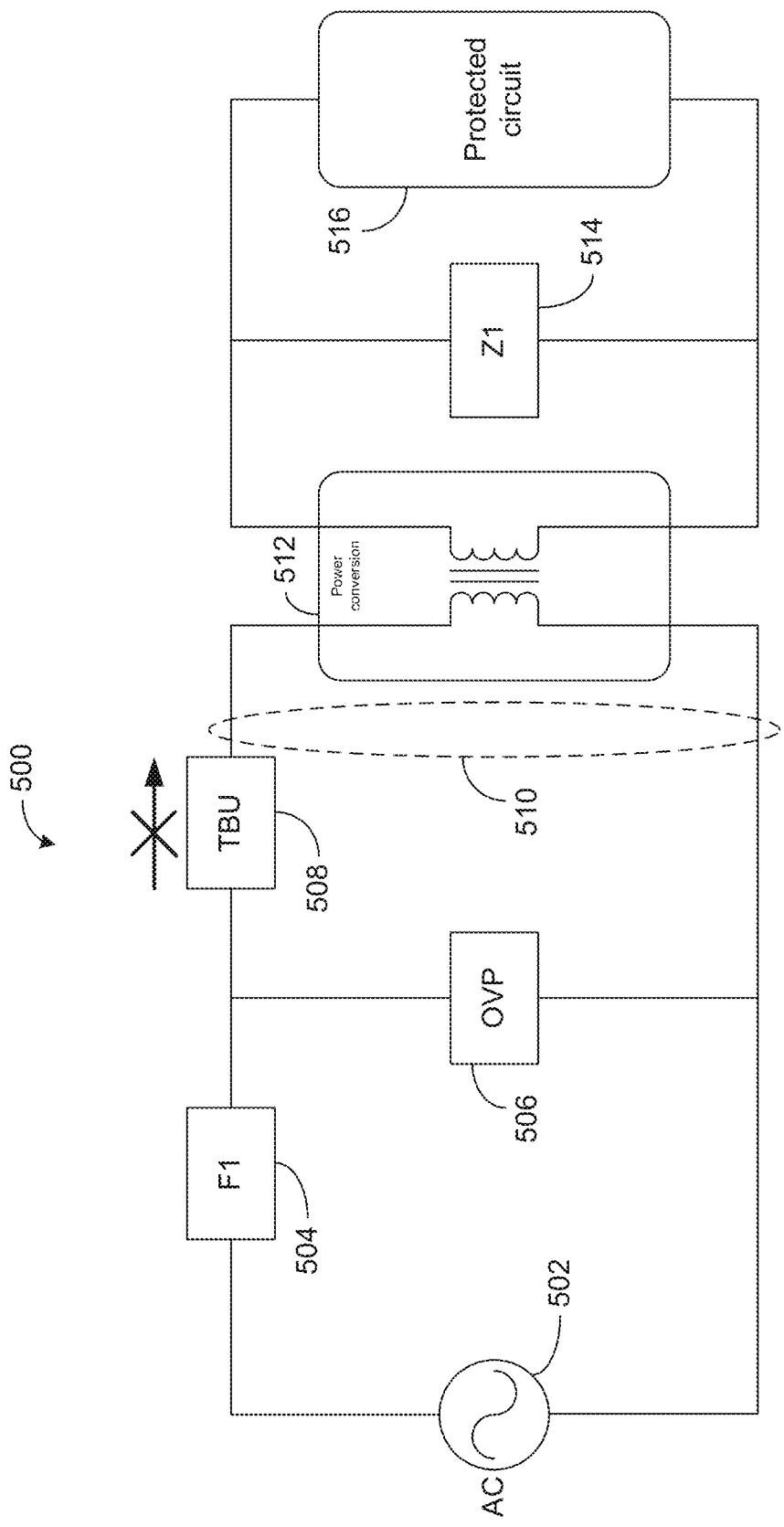
FIG. 17 shows an example of a transient blocking unit (TBU) being in an active state so as to block current flowing into the power conversion component.

FIG. 17 shows an example of the TBU 508 being in an active state so as to block current flowing into the power conversion component 512. In some embodiments, the TBU 508 in the active state can block passage of both positive and negative portions of AC current. In FIG. 17, the TBU 508 is depicted as blocking one direction (e.g., corresponding to the positive portion) of the AC current, even though it blocks the other direction. For the purpose of description of FIG. 17, however, such other direction of the AC current is assumed to be blocked from reaching the other side of the power conversion component 512. More particularly, the power conversion component 512 may be assumed to include rectification functionality, such that only positive or negative portion of the AC power passes. Thus, even if the TBU 508 only blocks the positive portion, the negative portion is blocked by the power conversion component 512.

States of the various components of the circuit 500 corresponding to the condition of FIG. 17 are provided in Table 7.

TABLE 7

| F1 | OVP | TBU | Z1 | Voltage V across the load 116 |
|---|---|---|---|---|
| Untripped | Inactive | Active | Active or Inactive | Zero |

In the example of FIG. 17, the TBU 508 being activated results in power being blocked from the AC line 510 to the load side of the power conversion component 512. Thus, if a crowbar activating event occurred on the AC line side, no power is being provided to the load side; and the crowbar circuit protection device 514 can become inactive. If a crowbar activating event occurred on the load side, the crowbar circuit protection device 514 may remain in the active state or return to the inactive state. For example, if the crowbar activating condition remains, even after the TBU activation, the crowbar circuit protection device 514 can remain active to protect the load. In another example, if the crowbar activating condition is no longer present, the crowbar circuit protection device 514 can revert back to the inactive state.

Based on the various examples as described herein in reference to FIGS. 13-17, one can see that a protected circuit (516) that is being powered by an AC source (502) can be protected at substantially all times from an event that results in an overvoltage condition. Once such an overvoltage condition clears, the crowbar circuit protection device 514 can reset, and the circuit 500 can resume normal operation.

Figure 18:
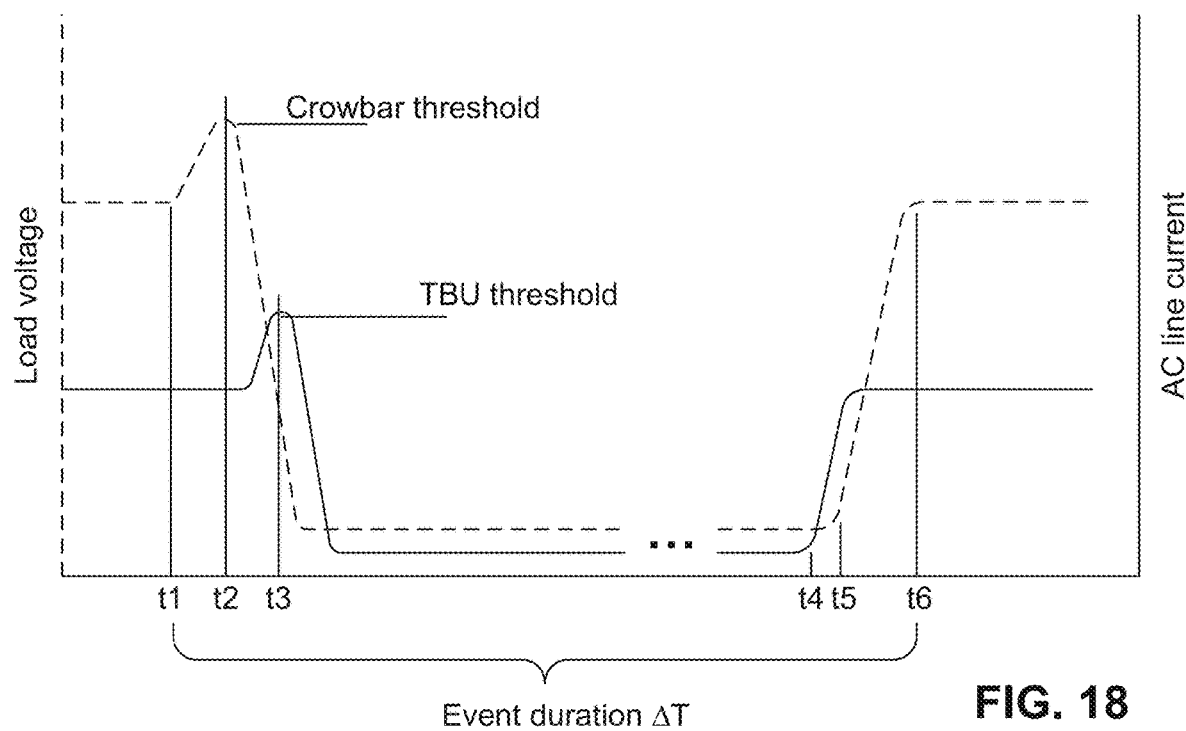
FIG. 18 shows example timing diagrams of load voltage and AC line current before, during, and after an event resulting in an overvoltage condition of a load being powered through an AC line.

FIG. 18 shows example timing diagrams of load voltage (dashed line) and AC line current (solid line) before, during, and after an event resulting in an overvoltage condition of a load being powered through an AC line. Before time t1, the circuit 500 of FIGS. 13-17 is shown to be in a normal operating state, with a normal load voltage being provided to the protected circuit (516). Such a load voltage results from power converted from the AC line (510).

At time t1, an overvoltage condition is shown to arise, resulting in an increase in the voltage being provided to the load. Such an increase in voltage is shown to continue until a crowbar threshold is reached at time t2. At such a time, the crowbar circuit protection device (514) becomes active and provides a low resistance shunt path, thereby decreasing the voltage being provided to the load.

As described herein, the low resistance crowbar path results in an increase in current therethrough, thereby inducing an increase in current in the AC line. Accordingly, the AC line current also increases until a TBU threshold is reached time t3. At such a time, the TBU (508) blocks the AC line current, thereby causing the AC line current to be blocked from reaching the power conversion component (512). Accordingly, the AC line current at the power conversion component, and thus the converted power, decrease to respective null levels.

In the example of FIG. 18, such null levels are shown to be maintained until the overvoltage condition no longer exists, and the crowbar circuit protection device (114) and the TBU (108) are reset. At such a time, (t4), the AC line current is allowed to reach a normal operating level. At time t5, load voltage can also begin to increase to its normal operating level (at time t6).

In the example of FIG. 18, an event duration ΔT can be considered to begin at time t1 and end at time t6. As described herein in reference to FIG. 19, such an event duration can be relatively short, long or anywhere in between. In some embodiments, the activation times associated with the crowbar circuit protection device (514) and the TBU (508) can be sufficiently small to provide effective protection during such various-duration events. It is noted that in some situations, the crowbar circuit protection device (514) may reset on every zero-crossing of an AC input voltage. In such a situation, the example sequence shown in FIG. 18 may be repeated every half-cycle or every cycle (in half-wave rectified configurations) of the AC input power.

Figure 19:
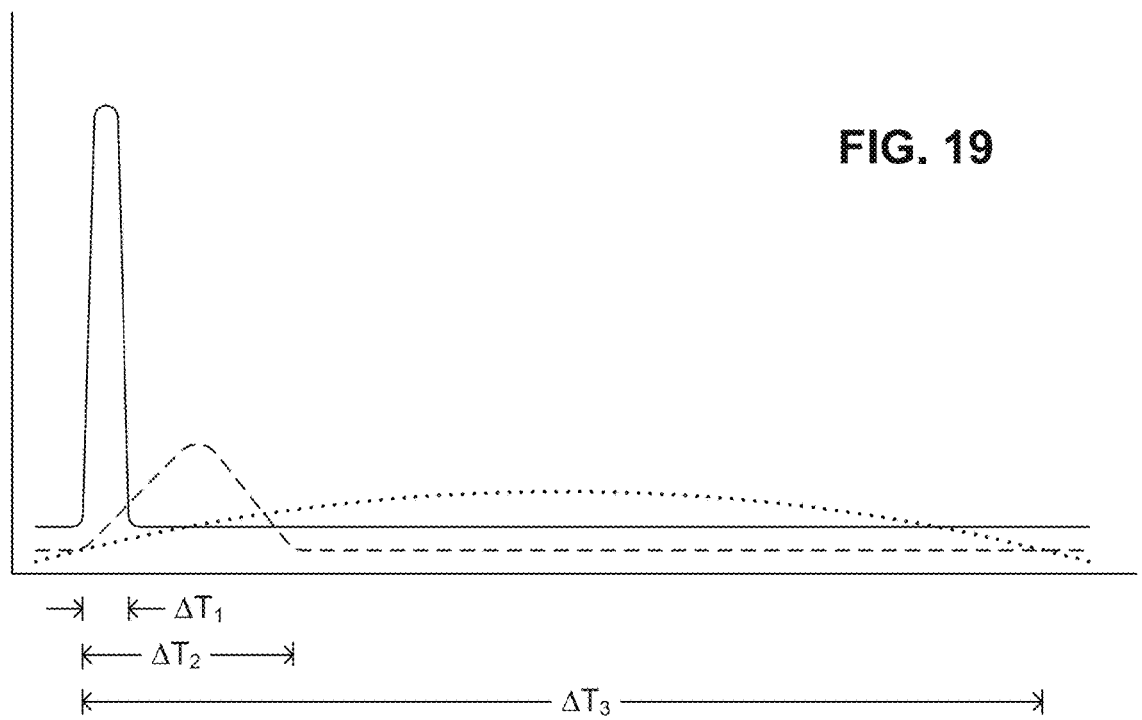
FIG. 19 shows examples of events that can result in damages to circuits if not protected.

FIG. 19 shows examples of events that can result in damages to circuits if not protected. For example, a short duration ($\Delta T_1$) event such as lightning can involve a large overvoltage. In another example, a sub-circuit failure can result in an overvoltage condition lasting longer (e.g., $\Delta T_2$) than the lightning example. In yet another example, in some situations, a voltage swell in an incoming line may last much longer than either of the two example durations. Such a long duration (e.g., $\Delta T_3$) of overvoltage condition may not have an overvoltage level as high as the lightning example; but can be just as damaging to a circuit.

Figure 20:
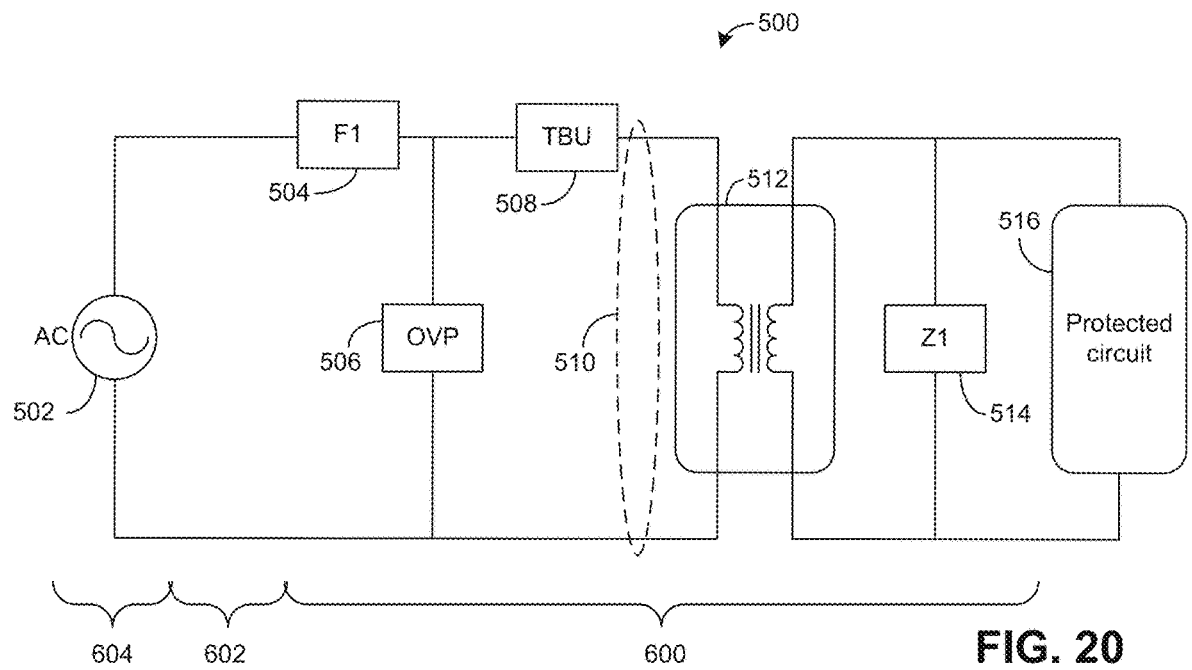
FIG. 20 shows that in some embodiments, the example circuit of FIG. 13 can be divided into different functional portions or blocks.

FIG. 20 shows the circuit 500 of FIGS. 13-17. In FIG. 20, such a circuit can be divided into different portions. For example, a portion can be considered to be a protective supply circuit 600 configured to provide power to a protected circuit 516. In some embodiments, such a protective supply circuit can include a crowbar circuit protection device 514, a power conversion component 512, and a TBU 508. In some embodiments, the protective supply circuit 600 may optionally include either or both of an overvoltage protection (OVP) device 506 and a fuse (F1) 504.

In the example of FIG. 20, a portion to the left of the protective supply circuit 600 can be considered to be a connection component 602, and a portion left of the connection component 602 can be considered to be an AC source 604. In such an example context, the protective supply circuit 600 can be configured to be connected to, or be capable of being connected to, a circuit (e.g., 516) to be protected. The protective supply circuit 600 can also be connected to, or be capable of being connected to, an AC source 604 through a connection component 602. It is noted that while various examples are described herein in the context of power being converted by power conversion component 512, one or more features of the present disclosure can also be implemented in a circuit without such a conversion component. In such a configuration, power from an AC source (e.g., 502) can be provided to a load circuit (e.g., 516) and a corresponding crowbar circuit protection device (e.g., 514) through an AC line (e.g., 510).

Figure 21:
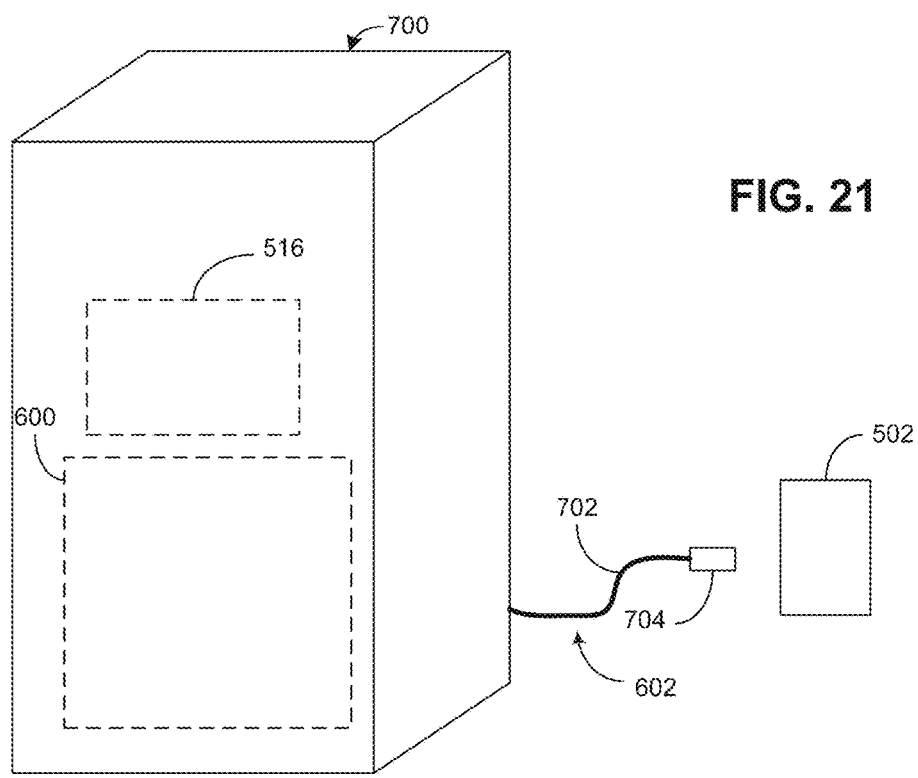
FIG. 21 shows an example of an apparatus having one or more features as described herein, where the apparatus can include one or more protected circuits that are supplied with power through a protective supply circuit.

FIG. 21 shows an example of an apparatus 700 having one or more features as described herein. In some embodiments, the apparatus 700 can include one or more protected circuits 516 that are supplied with power through a protective supply circuit 600. The protective supply circuit 600 can include one or more features as described herein, and can be configured to provide power to the one or more protected circuits 516 from an AC source 502. In the example of FIG. 21, the AC source 502 can be, for example, an electrical outlet configured to receive an appropriately configured plug 704. In some embodiments, such a plug can be connected to an electrical cord 702; thus, the cord 702 and the plug 704 can be parts of an AC power connection component 602 associated with the apparatus 700.

In some embodiments, the apparatus 700 can be any electrical device configured to be plugged into an AC outlet for operation. Such an electrical device can be, for example, a household appliance.

It will be understood that in some embodiments, at least some of the protective supply circuit 600 can be implemented outside of the apparatus, similar to the example described herein in reference to FIGS. 11 and 12.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

The above detailed description of embodiments of the invention is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. Also, while processes or blocks are at times shown as being performed in series, these processes or blocks may instead be performed in parallel, or may be performed at different times.

The teachings of the invention provided herein can be applied to other systems, not necessarily the system described above. The elements and acts of the various embodiments described above can be combined to provide further embodiments.

While some embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A protective circuit comprising:
   an AC line configured to provide power from an AC source;
   a first protection circuit coupled to the AC line and implemented to be electrically parallel with a load circuit, the first protection circuit configured to be in an inactive state to be substantially non-conducting when a voltage across the load circuit is in a normal range or an active state to be substantially conducting when the voltage across the load circuit has an overvoltage value greater than the normal range to shunt power away from the load circuit, the first protection circuit including an electrically series combination of a gas discharge tube (GDT) and a metal-oxide varistor (MOV); and a second protection circuit implemented to be electrically between the AC source and the load circuit, the second protection circuit configured to block power from the AC source in response to a condition resulting from the first protection circuit being in the active state, the condition including a high frequency component in a let-through signal in the active state of the first protection circuit.

2. The protective circuit of claim 1, wherein the second protection circuit includes an arc fault circuit interrupter (AFCI) implemented along the AC line and configured to block the power from the AC source upon sensing of the high frequency component.

3. The protective circuit of claim 1, wherein the electrically series combination of GDT and MOV includes an electrode of the GDT configured to also function as an electrode of the MOV.

4. An electrical apparatus comprising:
a load circuit; and
a protective circuit configured to provide power for the load circuit, the protective circuit including an AC line configured to provide power from an AC source, and a first protection circuit coupled to the AC line and implemented to be electrically parallel with a load circuit, the first protection circuit configured to be in an inactive state to be substantially non-conducting when a voltage across the load circuit is in a normal range or an active state to be substantially conducting when the voltage across the load circuit has an overvoltage value greater than the normal range to shunt power away from the load circuit, the first protection circuit including an electrically series combination of a gas discharge tube (GDT) and a metal-oxide varistor (MOV), the protective circuit further including a second protection circuit implemented to be electrically between the AC source and the load circuit, the second protection circuit configured to block power from the AC source in response to a condition resulting from the first protection circuit being in the active state, the condition including a high frequency component in a let-through signal in the active state of the first protection circuit.

5. The electrical apparatus of claim 4, wherein the electrical apparatus is an electrical appliance that includes a connection component configured to connect the protective circuit to the AC source so as to provide the power to the AC line.

6. The electrical apparatus of claim 4, wherein the second protection circuit is implemented as an arc fault circuit interrupter (AFCI) provided along the AC line and configured to block the power from the AC source upon sensing of the condition resulting from the first protection circuit being in the active state.

7. A method for protecting a circuit, the method comprising:
providing an AC line to deliver power from an AC source;
providing a first protection circuit coupled to the AC line and electrically parallel with a load circuit, the first protection circuit being in an inactive state to be substantially non-conducting when a voltage across the load circuit is in a normal range or an active state to be substantially conducting when the voltage across the load circuit has an overvoltage value greater than the normal range to shunt power away from the load circuit, the first protection circuit including an electrically series combination of a gas discharge tube (GDT) and a metal-oxide varistor (MOV); and
blocking power from the AC source in response to a condition resulting from the first protection circuit being in the active state, the condition including a high frequency component in a let-through signal in the active state of the first protection circuit.

* * * * *